July 1, 1930.  E. S. STADELMAN  1,769,864
COMBINED BEARING AND ECCENTRIC
Filed March 14, 1929
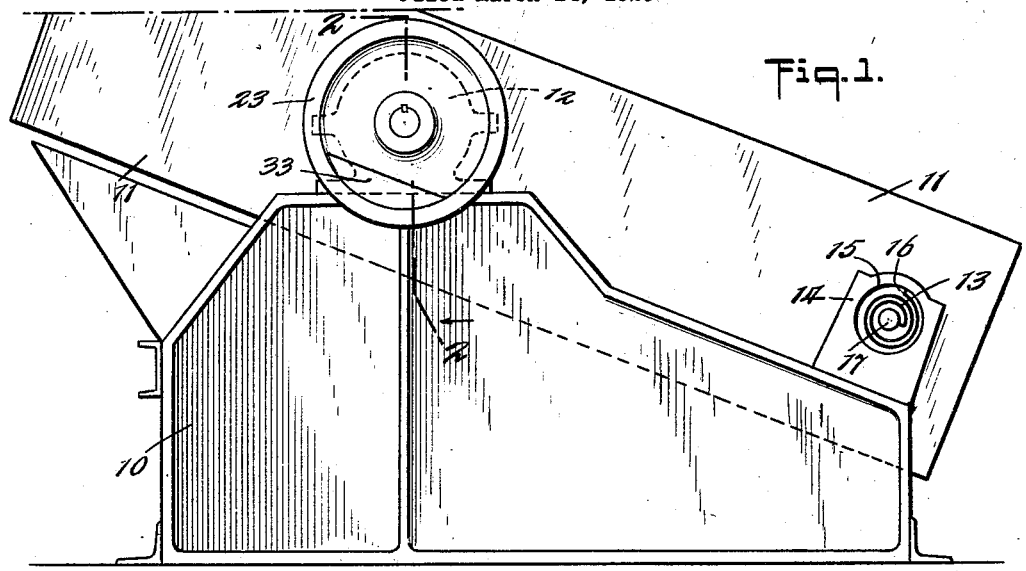
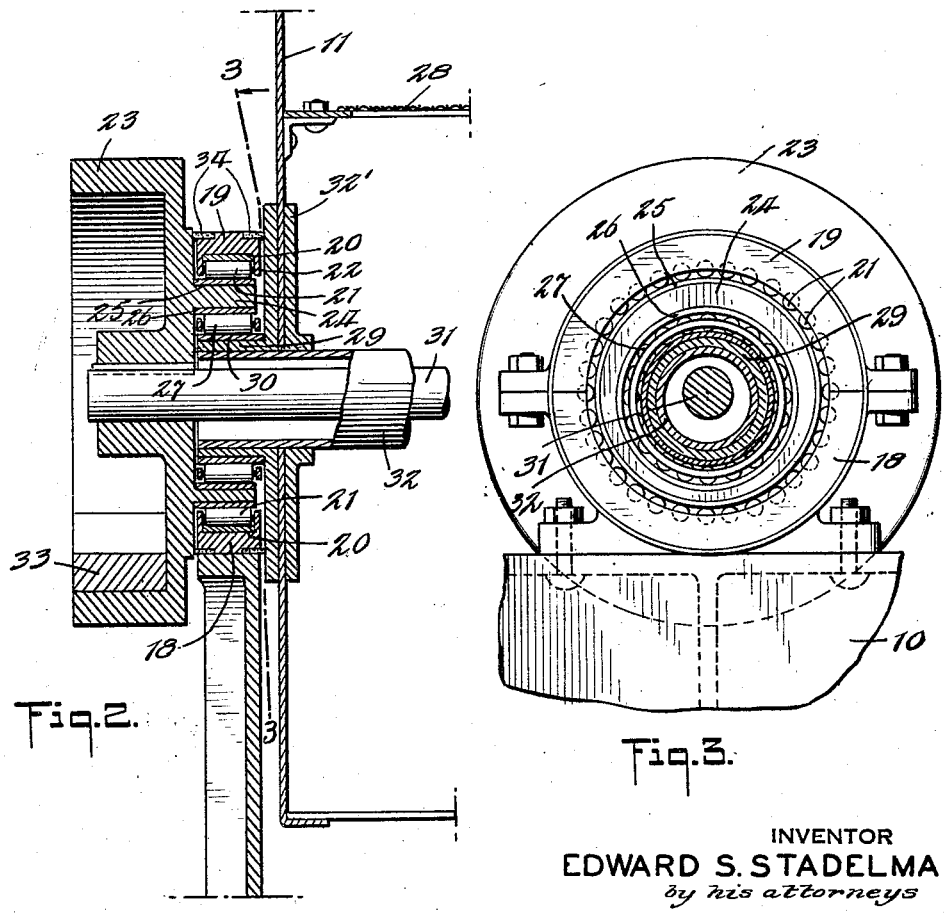
INVENTOR
EDWARD S. STADELMAN
by his attorneys
Howson and Howson Patented July 1, 1930

1,769,864

UNITED STATES PATENT OFFICE

EDWARD STEVENSON STADELMAN, OF NEWARK, NEW JERSEY

COMBINED BEARING AND ECCENTRIC

Application filed March 14, 1929. Serial No. 346,916.

This invention has to do with mechanism for converting rotary movement into gyratory movement and to a combined bearing and eccentric for a gyratory sifting screen.

The principal objects are to improve a mechanism of the kind mentioned above in point of strength, compactness, and simplicity; and to provide an improved driving mechanism for a shaker frame or sifting screen in order to decrease the floor space required for each shaker unit, to transmit the stresses to the main bearing without stressing other parts, to keep dust and fines out of the bearing and generally to lessen the cost of manufacture and of upkeep.

A preferred form of the invention is described hereinafter and is illustrated in the accompanying sheet of drawings to which reference is made in the course of the description.

In the drawings:

Figure 1 is a side elevation view of a gyratory shaker embodying the present invention.

Figure 2 is a view in section on the line 2—2 of Figure 1 showing the arrangement of the fixed bearing, the eccentric and the shaker frame.

Figure 3 is a view in section on the line 3—3 of Figure 2.

The gyratory shaker shown in Figure 1 is of a known type and illustrates but one of the many shakers with which this invention may be used. Its main parts are a fixed base 10 made up of two side frames spaced to receive between them the live frame 11. The live frame may be supported in various ways on the dead frame 10 but as shown here it is supported by a bearing 12 and a spiral spring support 13 on each side portion of the dead frame. Each spring support consists of a block 14 supported on the dead frame and having a central opening 15 within which one end 16 of a spiral spring is secured. The other end of the spring is secured to a trunnion 17 extending from the side of the live frame 11. Such a support is known and need be described no further here.

The present invention is particularly concerned with the construction of the combined bearing and eccentric by which the live frame 11 is supported and by which it is given a gyratory motion. Each of the two main fixed bearings 12 consists of a supporting block 18 and a cap 19 forming together a circular bearing. A ring 20 is used to provide a hardened lining on which there rests a set of rollers 21 held from movement sidewise by the flanges 22 on the bearing block and its cap.

Associated with each bearing is a fly wheel 23 having an annular lateral flange or extension 24 which has hardened steel rings 25 and 26 on its outer and inner surfaces. This flange or extension with its hardened rings forms an eccentric and bearing. The outer surface of this part 24 is concentric with the fly wheel but the inner surface is eccentric thereof and therefore eccentric of the outer surface and of the axis of rotation. The flange is of a size to fit within the main bearing so that the ring 25 engages the rollers 21. Another set of rollers 27 is mounted within the extension 24 to engage the hardened ring 26 and therefore is eccentric with respect to the axis of rotation of the flange 24 and the wheel. Felt sealing rings 34 shield the bearing from the outside. It will be understood that the bearing and eccentric on the opposite side frame are identical with the one shown and that the opposite fly wheel is connected to the other end of the shaft 31 in the same manner.

The shaker frame 11 which carries the screen 28 has lateral annular extensions 29 on its sides to fit within the sets of rollers 27 of the two main bearings. Each of such extensions 29 has a hardened ring 30 on its outer surface to bear against the rollers 27. By this arrangement the extension 29 is supported eccentrically of the axis of rotation of the wheel 23. A shaft 31 extends across the live frame, through the annular extensions 29 on the sides of the live frame and into the wheels 23 which are mounted on the fixed bearings. This shaft is secured to the wheels by keys so as to interconnect the wheels and cause them to rotate in unison about a common axis which is the axis with respect to which the sets of rollers 27 and the frame extensions 29 supported thereby are eccentric. A tubular sleeve 32 surrounds the shaft 31 and extends across the frame and into the frame extensions 29 with which it has a snug fit. A bracing flange 32 on the inner side of the frame 11 likewise fits snugly around the sleeve 32 and thus a shield is provided between the combined bearing and eccentric and the interior of the live frame which is a region of dust and fines.

A counter-weight 33 is mounted as usual within the fly wheel 23 on the side opposite from the thicker portion of the extension 24 which forms the eccentric.

As the wheels 23 are turned in any suitable way the live frame 11 receives a gyratory movement by reason of the fact that the frame extensions 29, by which it is supported, are eccentric of the axis about which the wheels rotate. The spiral springs supporting the other end of the frame cause the whole of the frame to have this gyratory movement and prevent the motion from becoming mere oscillation at the end of the frame. A peculiar advantage of this arrangement is that the weight of the live frame as well as the stresses caused by its gyratory movement are transmitted directly to the main fixed bearings 12 without putting any stress on the rotating or driving parts such as the shaft 31. If the shaft 31 serves to transmit torque from one wheel to the other, as where the driving effort is applied only to one wheel, the shaft need be large enough only to transmit such torque and it need not have the additional strength required by present constructions in which the shaft receives some or all of the bending stresses caused by the weight of the live frame and by its gyration. If both wheels are driven from outside sources, the shaft serves merely to keep them turning in unison and it need be strong enough only for such function. In either case it is not submitted to bending stresses in addition to those of torsion as in the constructions now commonly used.

It also is to be noted that a saving in space is effected as compared with the present known constructions because the eccentric is within the bearing and not along side of it. The space saved is a substantial amount and enables a greater number of shaker units to be included in a given floor area. The construction also protects the bearing and eccentric by reason of the fact that the tubular shield together with the side plates of the live frame completely shut off the interior of the live frame from the bearings and prevent dust, grit and fines from getting into the bearings.

I claim—

1. A fixed horizontal bearing and a wheel having a lateral annular flange extending within said bearing whereby said wheel is rotatably supported, said flange providing on its inner surface a bearing eccentric of its axis of rotation, in combination with a shaker frame on the opposite side of said bearing from said wheel and having an annular lateral extension within said eccentric bearing whereby said frame is supported and receives a gyratory movement upon turning of said wheel, and a shaft secured to said wheel and extending across said frame.

2. A fixed horizontal bearing and a wheel having a lateral extension within said bearing whereby said wheel is rotatably supported, said extension providing a bearing eccentric of its axis of rotation, in combination with a shaker frame on the opposite side of said bearing from said wheel and having an extension resting on said eccentric bearing whereby said frame is supported and receives a gyratory movement upon turning of said wheel.

3. A fixed horizontal bearing and a wheel having a lateral flange extending within said bearing whereby said wheel is rotatably supported, said flange providing on its inner surface a bearing eccentric of its axis of rotation, in combination with a shaker frame on the opposite side of said bearing from said wheel and having an annular extension within said eccentric bearing whereby said frame is supported and receives a gyratory movement upon turning of said wheel, and a tubular sleeve extending across said frame and within said extension to shield the bearing.

4. A dead frame, fixed bearings on opposite sides thereof and interconnected wheels having lateral extensions within said bearings whereby said wheels are supported for rotation in unison about a common axis, said extensions providing bearings eccentric of said axis, in combination with a shaker frame having members supported by said eccentric bearings whereby said frame is supported and receives a gyratory motion.

5. A dead frame, fixed bearings on opposite sides thereof and interconnected wheels having lateral extensions within said bearings whereby said wheels are supported for rotation in unison about a common axis, said extensions providing bearings eccentric of said axis, in combination with a shaker frame having annular members supported by said eccentric bearings, whereby said frame is supported and receives a gyratory motion, and a tubular sleeve extending across said frame and within said members to shield the bearings.

In testimony whereof I have signed my name to this specification.

EDWARD STEVENSON STADELMAN.